United States Patent
Omura

(10) Patent No.: US 12,494,543 B2
(45) Date of Patent: Dec. 9, 2025

(54) POWER STORAGE MODULE

(71) Applicant: Prime Planet Energy & Solutions, Inc., Tokyo (JP)

(72) Inventor: Tetsuji Omura, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 696 days.

(21) Appl. No.: 17/857,178

(22) Filed: Jul. 5, 2022

(65) Prior Publication Data
US 2023/0008180 A1    Jan. 12, 2023

(30) Foreign Application Priority Data
Jul. 6, 2021   (JP) .................................. 2021-111890

(51) Int. Cl.
*H01M 50/264*    (2021.01)
*H01M 50/209*    (2021.01)
*H01M 50/271*    (2021.01)

(52) U.S. Cl.
CPC ....... *H01M 50/264* (2021.01); *H01M 50/209* (2021.01); *H01M 50/271* (2021.01)

(58) Field of Classification Search
CPC . H01M 50/264; H01M 50/209; H01M 50/271
See application file for complete search history.

(56) References Cited

U.S. PATENT DOCUMENTS

| | | | |
|---|---|---|---|
| 2012/0315508 A1* | 12/2012 | Kurita ................. | H01M 50/227 429/7 |
| 2019/0237725 A1* | 8/2019 | Kawaguchi .............. | B60K 1/04 |
| 2021/0091349 A1 | 3/2021 | Terauchi et al. | |
| 2021/0249724 A1* | 8/2021 | Ju ........................ | H01M 50/579 |
| 2021/0305654 A1* | 9/2021 | Iwatsuki ............. | H01M 50/383 |
| 2022/0376337 A1* | 11/2022 | Jin ....................... | H01M 50/249 |

FOREIGN PATENT DOCUMENTS

WO         2019130936 A1    7/2019

* cited by examiner

*Primary Examiner* — Nicholas A Smith
*Assistant Examiner* — Benjamin Eli Kass-Mullet
(74) *Attorney, Agent, or Firm* — HAUPTMAN HAM, LLP

(57) ABSTRACT

A plurality of first protrusions each protruding from one of an end plate and a contact plate portion toward the other of the end plate and the contact plate portion are provided side by side in the second direction. Each of the plurality of first protrusions has a top portion at a tip of the first protrusion with a width of the first protrusion in the second direction being narrower in a direction from the one of the end plate and the contact plate portion toward the other of the end plate and the contact plate portion, and is in abutment with the other of the end plate and the contact plate portion at the top portion. The plurality of first protrusions include a first protrusion having a top portion overlapping with any one joining portion of a plurality of joining portions when viewed in the first direction.

17 Claims, 7 Drawing Sheets

Comparative Example

Comparative Example

POWER STORAGE MODULE

This nonprovisional application is based on Japanese Patent Application No. 2021-111890 filed on Jul. 6, 2021, with the Japan Patent Office, the entire contents of which are hereby incorporated by reference.

BACKGROUND OF THE INVENTION

Field of the Invention

The present technology relates to a power storage module.

Description of the Background Art

WO 2019/130936 is a prior art document that discloses a configuration of a power supply device. The power supply device described in WO 2019/130936 includes a battery stack, a pair of end plates, and a bind bar. The pair of end plates are disposed at both ends of the battery stack in the stacking direction of the battery stack. The bind bar is connected to the pair of end plates to hold the battery stack. The bind bar includes a plate-shaped bar and a locking block. The plate-shaped bar extends in the stacking direction of the battery stack. The locking block is fixed to the plate-shaped bar by a welding structure and protrudes toward each of the end plates. The end plate includes a stopper portion in abutment with the locking block. The entire opposing surface of the locking block on the stopper portion side is in abutment with the stopper portion and is in close contact therewith.

SUMMARY OF THE INVENTION

When the end plate and the restraint member are in surface contact with each other, the abutment positions of the end plate and the restraint member may become unstable due to microscopic unevenness of the contact surfaces. In this case, when load is applied from the end plate to the restraint member due to expansion of the stack of the power storage cells, load is applied to a joining portion between constituent members of the restraint member in an unstable manner, with the result that proof stress of the joining portion may be decreased.

The present disclosure has been made to solve the above-described problem, and has an object to provide a power storage module to stabilize a manner in which load is applied to a joining portion between constituent members of a restraint member so as to improve proof stress of the joining portion.

A power storage module according to the present technology includes a stack, an end plate, and a restraint member. In the stack, power storage cells are stacked in a first direction. The end plate is provided at each of both ends of the stack in the first direction. The restraint member is in abutment with the end plate in the first direction. The restraint member includes a plate-shaped portion and a contact plate portion. The plate-shaped portion extends in the first direction. The contact plate portion is joined to the plate-shaped portion by a plurality of joining portions arranged side by side in a second direction orthogonal to the first direction, and is in abutment with the end plate. A plurality of first protrusions each protruding from one of the end plate and the contact plate toward the other of the end plate and the contact plate are provided side by side in the second direction on an abutment surface between the end plate and the contact plate portion. Each of the plurality of first protrusions has a top portion at a tip of the first protrusion with a width of the first protrusion in the second direction being narrower in a direction from the one of the end plate and the contact plate portion toward the other of the end plate and the contact plate portion, and is in abutment with the other of the end plate and the contact plate portion at the top portion. The plurality of first protrusions include a first protrusion having a top portion overlapping with any one joining portion of the plurality of joining portions when viewed in the first direction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
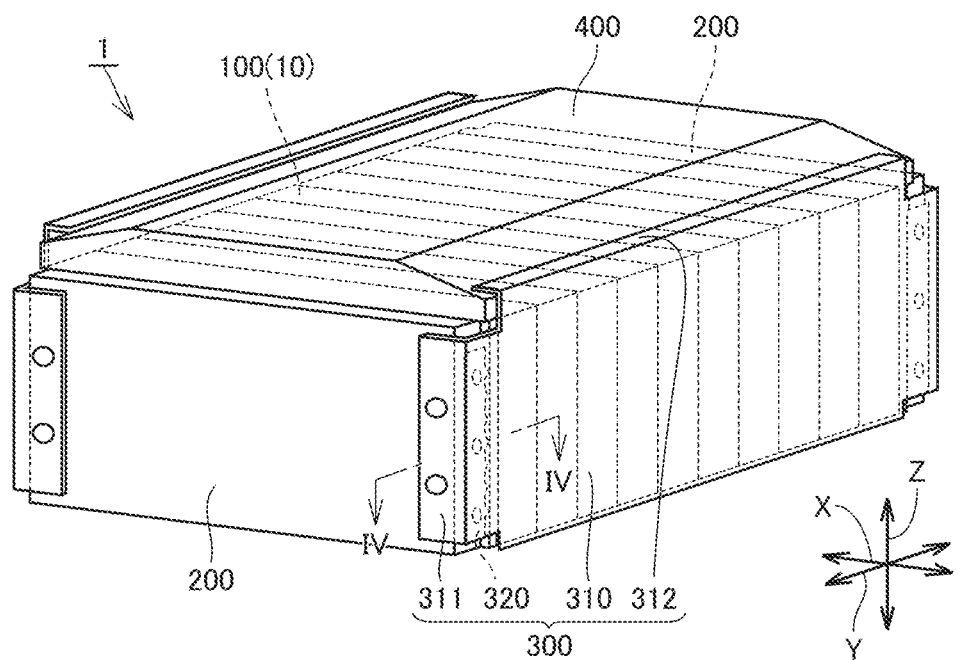
FIG. 1 is a perspective view showing a configuration of a power storage module according to a first embodiment of the present technology.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, when a certain configuration is included, a configuration other than the foregoing configuration may or may not be included. Further, the present technology is not limited to one that necessarily exhibits all the functions and effects stated in the present embodiment.

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

In the present specification, the "power storage cell" or the "power storage module" is not limited to a battery cell or a battery module, and may include a capacitor cell or a capacitor module.

It should be noted that in the figures, an X direction, which serves as a third direction, represents a direction orthogonal to the stacking direction of the power storage cells and orthogonal to a direction in which joining portions of the restraint member are arranged side by side, a Y direction, which serves as a first direction, represents the stacking direction of the power storage cells, and a Z direction, which serves as a second direction, represents a direction in which the joining portions of the restraint member are arranged side by side.

First Embodiment

Figure 2:
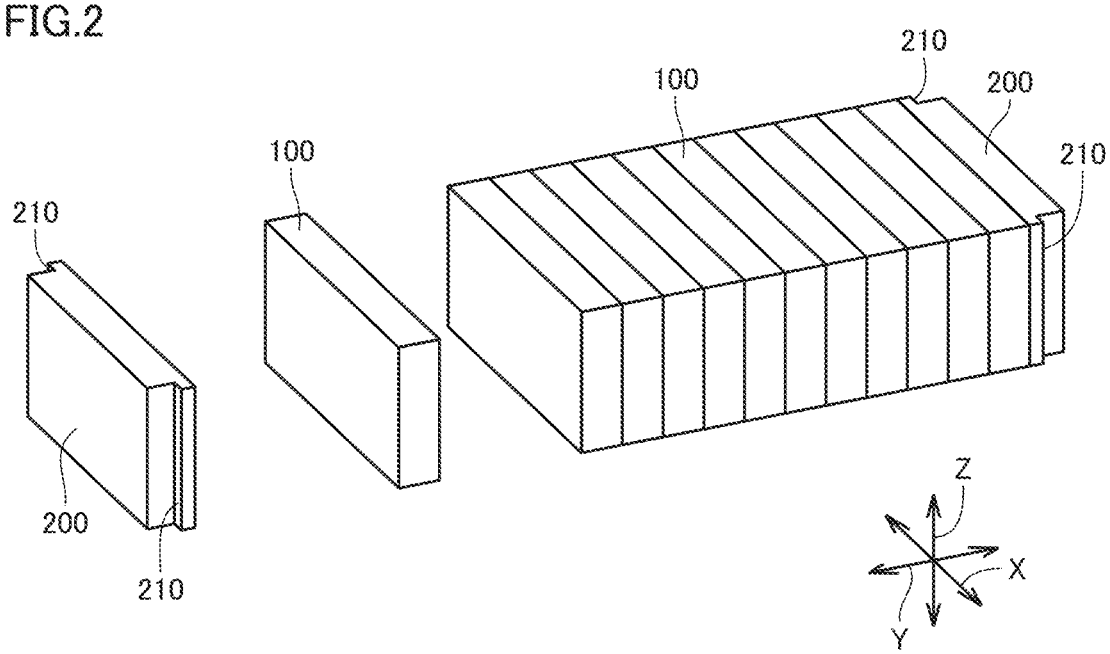
FIG. 2 is a perspective view showing configurations of power storage cells and end plates included in the power storage module according to the first embodiment of the present technology.

FIG. 1 is a perspective view showing a configuration of a power storage module according to a first embodiment of the present technology. FIG. 2 is a perspective view showing configurations of power storage cells and end plates included in the power storage module according to the first embodiment of the present technology.

As shown in FIGS. 1 and 2, a power storage module 1 serving as an battery pack includes a stack 10, end plates 200, a restraint member 300, and a bus bar plate 400.

In stack 10, a plurality of power storage cells 100 are stacked side by side in a first direction (Y direction). A separator (not shown) is interposed between power storage cells 100. The plurality of power storage cells 100 sandwiched between two end plates 200 are pressed by end plates 200 and are therefore restrained between two end plates 200.

End plates 200 are provided at both ends of stack 10 in the first direction (Y direction). Each of end plates 200 is fixed to a base such as a case that accommodates power storage module 1. Stepped portions 210 are provided at both ends of end plate 200 in the X direction on the side opposite to power storage cells 100 in the Y direction. End plate 200 is composed of, for example, aluminum or iron.

As shown in FIG. 1, restraint member 300 is provided at both ends of each of stack 10 and end plate 200 in the X direction. When restraint member 300 is engaged with end plates 200 with compressive force in the Y direction being applied to the plurality of stacked power storage cells 100 and end plates 200 and then the compressive force is released, tensile force acts on restraint member 300 that connects two end plates 200. As a counteraction, restraint member 300 presses two end plates 200 in directions in which they are brought to be closer to each other. As a result, restraint member 300 restrains stack 10 in the Y direction.

Restraint member 300 includes a plate-shaped portion 310, a first flange portion 311, a second flange portion 312, and a contact plate portion 320.

Plate-shaped portion 310 is a member extending in the first direction (Y direction). Plate-shaped portion 310 is composed of iron, for example.

First flange portion 311 is connected to both ends of plate-shaped portion 310 in the Y direction. First flange portion 311 is fixed to end plate 200. First flange portion 311 is fixed to end plate 200 by a known fixing method such as fastening of bolt, for example. Thus, restraint member 300 connects two end plates 200 to each other.

Second flange portion 312 extends from the side surface of stack 10 to reach the upper surface and bottom surface of stack 10. By providing second flange portion 312, rigidity of restraint member 300 formed to be relatively thin can be secured.

Contact plate portion 320 is a plate-shaped member provided on the end plate 200 side with respect to plate-shaped portion 310. Contact plate portion 320 is composed of iron, for example.

Bus bar plate 400 is disposed on the upper surface of stack 10. Bus bar plate 400 is sandwiched between stack 10 and second flange portion 312 at the both ends in the X direction, and are therefore fixed to stack 10.

In bus bar plate 400, a gas duct region (not shown) for discharging gas inside power storage cell 100 to outside is provided along the Y direction at a central portion in the X direction. Voltage detection wires (not shown) are disposed at both ends beside the gas duct region in the X direction. Further, bus bar accommodating regions are provided at both ends beside the gas duct region and the voltage detection wires in the X direction so as to accommodate a bus bar (not shown) of power storage cell 100.

Figure 3:
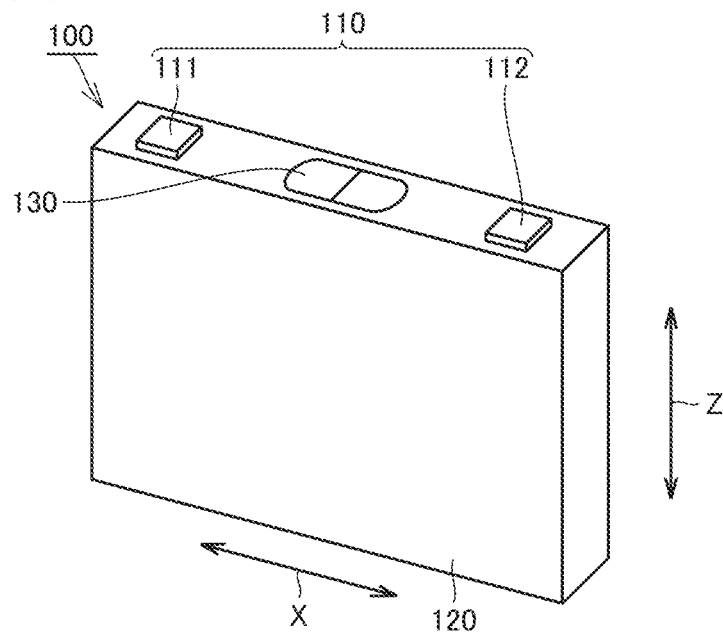
FIG. 3 is a perspective view showing a configuration of a power storage cell included in the power storage module according to the first embodiment of the present technology.

FIG. 3 is a perspective view showing a configuration of a power storage cell included in the power storage module according to the first embodiment of the present technology. As shown in FIG. 3, power storage cell 100 includes an electrode terminal 110, an exterior package 120, and a gas discharge valve 130.

Electrode terminal 110 includes a positive electrode terminal 111 and a negative electrode terminal 112. Electrode terminal 110 is formed on exterior package 120. Exterior package 120 is formed to have a substantially rectangular parallelepiped shape. An electrode assembly (not shown) and an electrolyte solution (not shown) are accommodated in exterior package 120. Gas discharge valve 130 is fractured when pressure inside exterior package 120 becomes equal to or more than a predetermined value. Thus, gas in exterior package 120 is discharged to the outside of exterior package 120.

Figure 4:
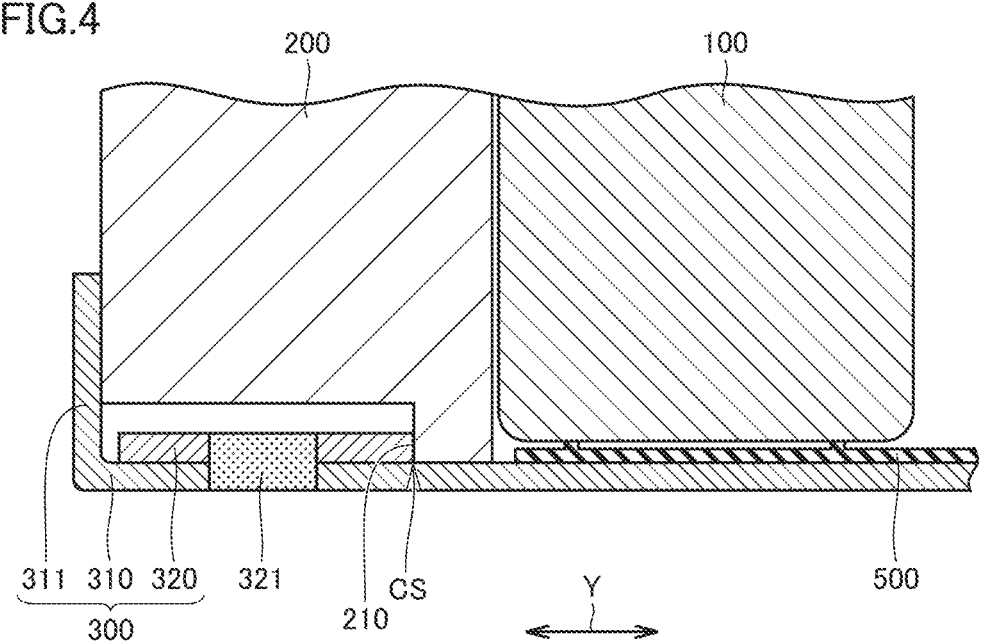
FIG. 4 is a cross sectional view of the power storage module of FIG. 1 when viewed in a direction of arrows of a line IV-IV.

FIG. 4 is a cross sectional view of the restraint member when viewed in a direction of arrows of a line IV-IV of FIG. 1. As shown in FIG. 4, a spacer 500 is provided between restraint member 300 and power storage cell 100. Power storage cell 100 and restraint member 300 are insulated from each other by spacer 500.

Figure 5:
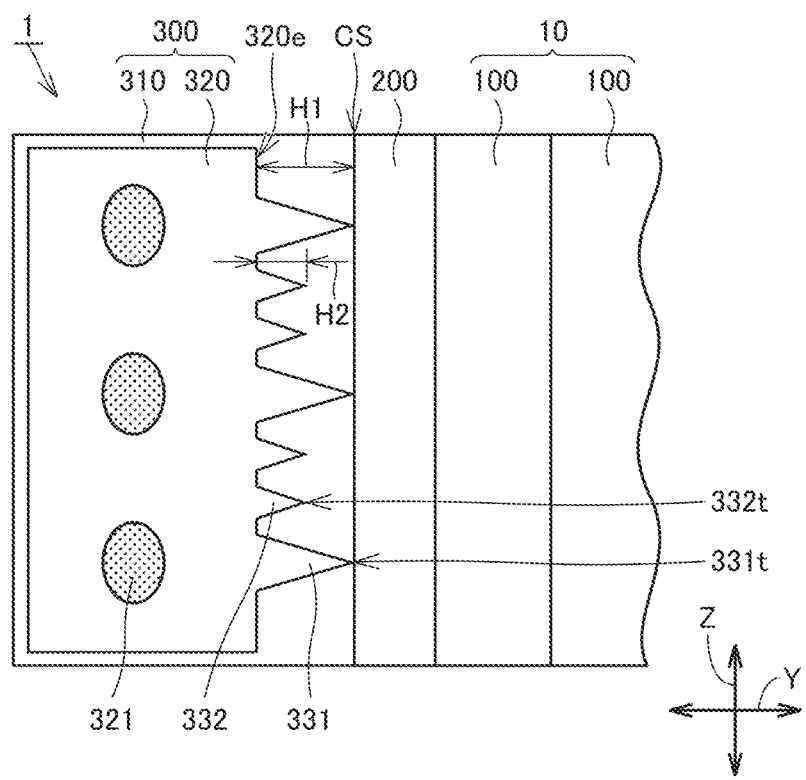
FIG. 5 is a schematic diagram showing the configuration of the power storage module according to the first embodiment of the present technology.

FIG. 5 is a schematic diagram showing the configuration of the power storage module according to the first embodiment of the present technology. As shown in FIGS. 4 and 5, restraint member 300 is in abutment with end plate 200 in the first direction (Y direction). Specifically, contact plate portion 320 of restraint member 300 is in abutment with end plate 200 on abutment surface CS in the first direction (Y direction). As shown in FIG. 4, in the present embodiment, abutment surface CS is located at stepped portion 210.

Contact plate portion 320 is joined to plate-shaped portion 310 by a plurality of joining portions 321 arranged side by side in the second direction (Z direction) orthogonal to the first direction (Y direction). Contact plate portion 320 is joined to plate-shaped portion 310 by spot welding, for example. The joining at each of the plurality of joining portions 321 is performed at an interval of, for example, 15 mm or more and 30 mm or less in the Z direction.

As shown in FIG. 5, power storage module 1 further includes a plurality of first protrusions 331 and at least one second protrusion 332.

Each of the plurality of first protrusions 331 and at least one second protrusion 332 are formed in contact plate portion 320. In the present embodiment, each of the plurality of first protrusions 331 and the plurality of second protrusions 332 is formed in contact plate portion 320 by press punching, for example.

On abutment surface CS between end plate 200 and contact plate portion 320, the plurality of first protrusions 331 each protruding from one of end plate 200 and contact plate portion 320 toward the other of end plate 200 and contact plate portion 320 are provided side by side in the second direction (Z direction). In the present embodiment, the plurality of first protrusions 331 are disposed side by side in the Z direction to extend from contact plate portion 320, which serves as the one of end plate 200 and contact plate portion 320, toward end plate 200, which serves as the other of end plate 200 and contact plate portion 320.

Each of the plurality of first protrusions 331 has a top portion 331t at a tip of first protrusion 331 with a width of first protrusion 331 in the second direction (Z direction) being narrower in a direction from contact plate portion 320 toward end plate 200. Each of the plurality of first protrusions 331 is in abutment with end plate 200 at top portion 331t on abutment surface CS.

The plurality of first protrusions 331 include a first protrusion 331 having a top portion 331t overlapping with any one joining portion 321 of the plurality of joining portions 321 when viewed in the first direction (Y direction). In the present embodiment, when viewed in the Y direction, each of top portions 331t of the plurality of first protrusions 331 overlaps with a corresponding one of the plurality of joining portions 321.

Each of the plurality of first protrusions 331 has a protruding height H1. Protruding height H1 is a height in the Y direction from an end surface 320e of contact plate portion 320 facing abutment surface CS. Protruding height H1 is desirably the same in each of the plurality of first protrusions 331.

It should be noted that protruding heights H1 of the plurality of first protrusions 331 may be different from each other. When protruding heights H1 of the plurality of first protrusions 331 are different from each other, protruding heights H1 of first protrusions 331 at both ends in the Z direction among the plurality of first protrusions 331 are desirably higher than protruding height(s) H1 of other first protrusion(s) 331. Since protruding heights H1 of first protrusions 331 at the both ends in the Z direction are higher than protruding height(s) H1 of other first protrusion(s) 331, the posture of end plate 200 is less likely to be inclined with respect to contact plate portion 320 when power storage cell 100 is expanded, with the result that the shape of power storage module 1 can be stabilized.

At least one second protrusion 332 is provided between the plurality of first protrusions 331. In the present embodiment, two second protrusions 332 are provided between the plurality of first protrusions 331.

Each of the plurality of second protrusions 332 protrudes from contact plate portion 320 toward end plate 200. The width of each of the plurality of second protrusions 332 in the second direction (Z direction) is narrower in the direction from contact plate portion 320 toward end plate 200. Each of the plurality of second protrusions 332 has a top portion 332t at a tip of second protrusion 332 with a width of second protrusion 332 in the Z direction being narrower.

Each of the plurality of second protrusions 332 is disposed at a position at which second protrusion 332 can be brought into abutment with end plate 200. Specifically, a protruding height H2 of each of the plurality of second protrusions 332 in the first direction (Y direction) from end surface 320e of contact plate portion 320 facing abutment surface CS is lower than protruding height H1 of each of the plurality of first protrusions 331 in the first direction (Y direction) from end surface 320e of contact plate portion 320 facing abutment surface CS. Thus, after each of the plurality of first protrusions 331 is pressed and deformed in the Y direction by end plate 200, each of the plurality of second protrusions 332 is brought into abutment with end plate 200. Protruding height H2 is lower than protruding height H1 by a height falling within a range of, for example, 0.2 mm or more and 0.4 mm or less.

It should be noted that restraint member 300 in the present embodiment constitutes a layer structure by plate-shaped portion 310 and contact plate portion 320; however, it is not limited to this configuration, and the layer structure may be formed by folding one plate-shaped member over itself.

Further, in the present embodiment, as at least one second protrusion 332, two second protrusions 332 are disposed between the plurality of first protrusions 331; however, the other number of second protrusions 332 than two may be disposed therebetween.

Further, each of first protrusion 331 and second protrusion 332 has an angular shape toward end plate 200; however, it is not limited to this configuration, and the shape may be a semicircular shape or a trapezoidal shape.

Figure 6:
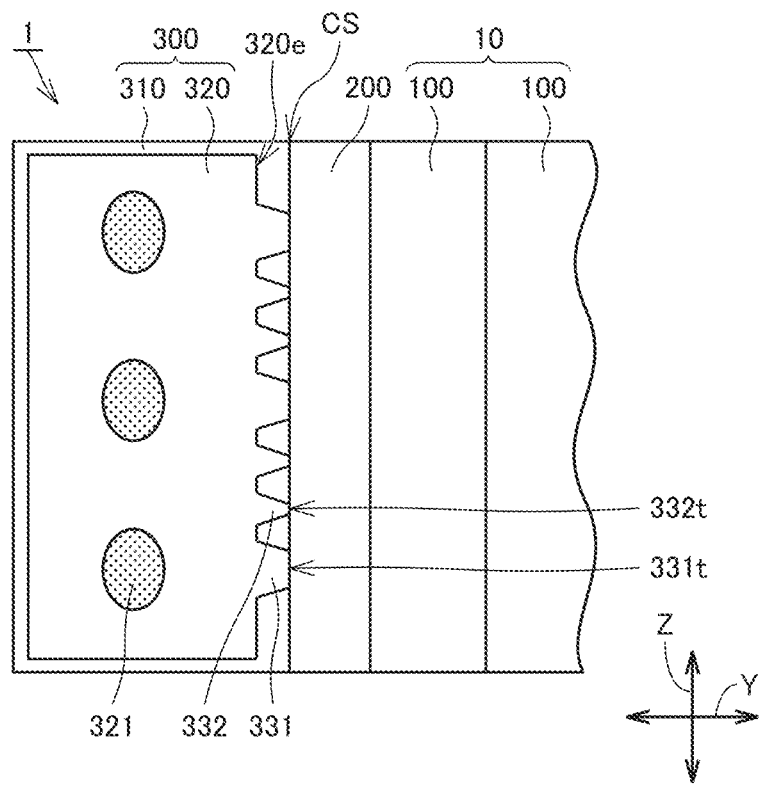
FIG. 6 is a schematic diagram showing a state in which the power storage cell included in the power storage module according to the first embodiment of the present technology is expanded.

FIG. 6 is a schematic diagram showing a state in which the power storage cell included in the power storage module according to the first embodiment of the present technology is expanded. As shown in FIG. 6, end plate 200 is moved to the contact plate portion 320 side in the Y direction in response to expansion of power storage cell 100. Thus, when load is applied from end plate 200 to contact plate portion 320, each of the plurality of first protrusions 331 is deformed to cause collapse of top portion 331t. Thereafter, when power storage cell 100 is further expanded, end plate 200 is further moved in the Y direction to bring end plate 200 into abutment with each of the plurality of second protrusions 332, with the result that load is applied to the plurality of second protrusions 332. As a result, each of the plurality of second protrusions 332 is deformed to cause collapse of top portion 332t as with each of the plurality of first protrusions 331.

Here, a comparative example for the power storage module according to the first embodiment of the present technology will be described. Since the power storage module according to the below-described comparative example is different from the power storage module according to the first embodiment of the present technology in terms of the configuration of the contact plate portion, the same configurations as those of the power storage module according to the first embodiment of the present technology will not be described repeatedly.

Figure 7:
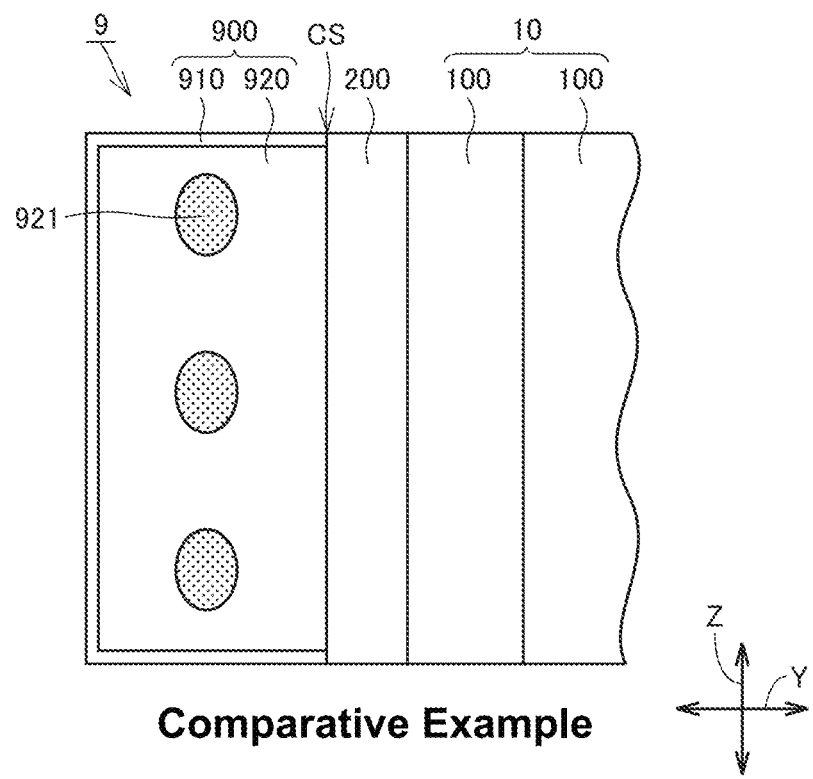
FIG. 7 is a schematic diagram showing a configuration of a power storage module according to a first comparative example.

FIG. 7 is a schematic diagram showing a configuration of a power storage module according to a first comparative example. As shown in FIG. 7, a power storage module 9 according to the first comparative example includes power storage cells 100, an end plate 200, and a restraint member 900. Restraint member 900 includes a plate-shaped portion 910 and a contact plate portion 920. Plate-shaped portion 910 and contact plate portion 920 are joined to each other by a plurality of joining portions 921.

Contact plate portion 920 is in surface contact with end plate 200 on abutment surface CS.

Contact plate portion 920 and end plate 200 may have microscopic unevenness at their surfaces in contact with each other on abutment surface CS. In this case, since contact plate portion 920 and end plate 200 are in abutment with each other at an arbitrary position in the microscopic unevenness, the abutment position becomes unstable. Thus, the shape of power storage module 9 becomes unstable.

Further, since the abutment position between contact plate portion 920 and end plate 200 becomes unstable, a position at which load is applied from end plate 200 to contact plate portion 920 due to the expansion of power storage cell 100 becomes unstable. Thus, a direction of load applied to the plurality of joining portions 921 becomes unstable. As a result, proof stress of each of the plurality of joining portions 921 against the load may be decreased.

Figure 8:
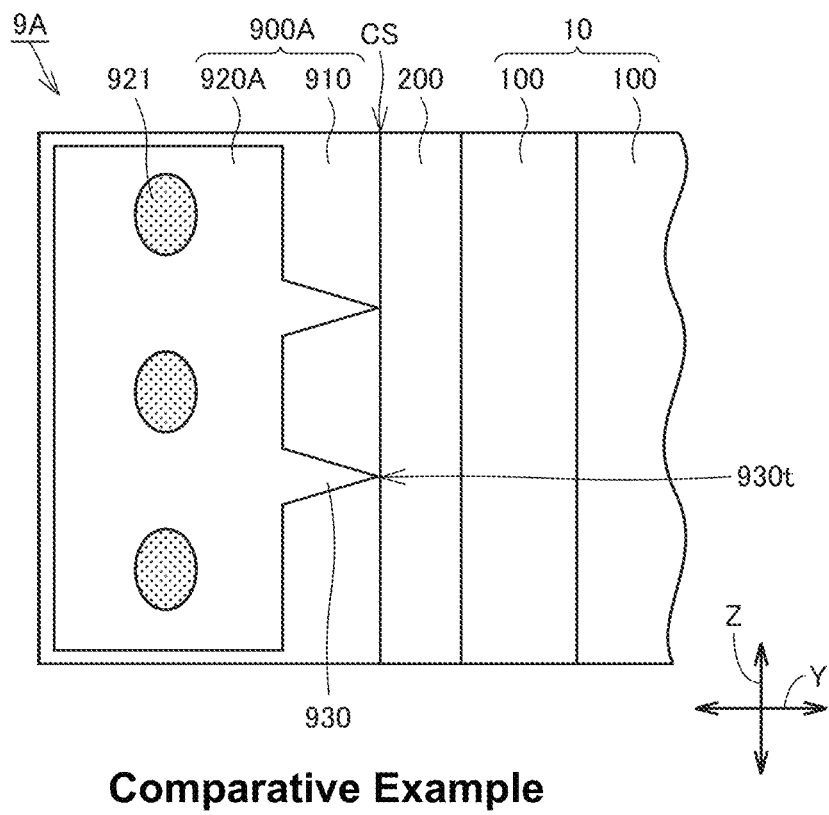
FIG. 8 is a schematic diagram showing a configuration of a power storage module according to a second comparative example.

FIG. 8 is a schematic diagram showing a configuration of a power storage module according to a second comparative example. As shown in FIG. 8, a power storage module 9A according to the second comparative example includes power storage cells 100, an end plate 200, and a restraint member 900A. Restraint member 900A includes a plate-shaped portion 910 and a contact plate portion 920A. Plate-shaped portion 910 and contact plate portion 920A are joined to each other by a plurality of joining portions 921.

Contact plate portion 920A has a plurality of protrusions 930 protruding from end plate 200. Each of the plurality of protrusions 930 has a top portion 930t at a tip of protrusion 930 with a width of protrusion 930 in the Z direction being narrower.

Restraint member 900A is in abutment with end plate 200 at top portion 930t of each of the plurality of protrusions 930 on abutment surface CS.

The plurality of protrusions 930 are not disposed to overlap with the plurality of joining portions 921 in the Y direction. When load is applied from end plate 200 to contact plate portion 920A due to expansion of power storage cell 100, contact plate portion 920A is fed with load in the Y direction from the abutment position of each of the plurality of protrusions 930. Load applied to the plurality of protrusions 930 is propagated to each of the plurality of joining portions 921. In this case, the load is applied to the plurality of joining portions 921 obliquely with respect to the Y direction, so that the plurality of joining portions 921 are fed with load in a rotational direction on the YZ plane. Thus, the load resulting from the expansion of power storage cell 100 is less likely to be stably applied to joining portions 921, with the result that the proof stress of each of joining portions 921 against the load may be decreased.

On the other hand, as shown in FIGS. 5 and 6, in power storage module 1 according to the present embodiment, load is applied from end plate 200 to contact plate portion 320 in the Y direction by the expansion of power storage cell 100. Load applied to the plurality of first protrusions 331 and the plurality of second protrusions 332 is propagated to each of the plurality of joining portions 321. On this occasion, since each of the plurality of joining portions 321 is fed with load mainly composed of load from first protrusions 331 having top portions 331t overlapping with joining portions 321 when viewed in the Y direction, load can be stably applied to joining portions 321 in the Y direction. As a result, the proof stress of each of joining portions 321 against the load resulting from the expansion of power storage cell 100 is improved.

It should be noted that, in the present embodiment, due to the load resulting from the expansion of power storage cell 100, first protrusions 331 and second protrusions 332 are deformed and end plates 200 are not deformed; however, it is not limited to this configuration, and the following configuration may be employed: portions of end plate 200 in abutment with first protrusions 331 and second protrusions 332 are deformed and portions of end plate 200 not in abutment with first protrusions 331 and second protrusions 332 are not deformed.

In power storage module 1 according to the first embodiment of the present technology, since at least one of the plurality of first protrusions 331 is arranged beside one of the plurality of joining portions 321 in the first direction (Y direction), load applied from end plate 200 to contact plate portion 320 can be stably applied to joining portion 321 arranged beside first protrusion 331, with the result that the proof stress of joining portion 321 can be improved.

In power storage module 1 according to the first embodiment of the present technology, since the plurality of second protrusions 332 are provided, load applied from end plate 200 to contact plate portion 320 can be distributed to each of the plurality of first protrusions 331 and the plurality of second protrusions 332, with the result that load can be evenly applied to the plurality of joining portions 321 while reducing burden on each of the plurality of joining portions 321. Accordingly, the burden on each of the plurality of joining portions 321 with regard to the load is reduced, with the result that strength of power storage module 1 can be increased as a whole.

In power storage module 1 according to the first embodiment of the present technology, since protruding height H2 of each of the plurality of second protrusions 332 is lower than protruding height H1 of each of the plurality of first protrusions 331, second protrusion 332 can be brought into abutment with end plate 200 after first protrusion 331 is deformed, with the result that the plurality of joining portions 321 can be evenly fed with load by second protrusions 332 while stably applying load from first protrusions 331 to joining portions 321.

In power storage module 1 according to the first embodiment of the present technology, since first protrusions 331 and second protrusions 332 are provided on contact plate portion 320, first protrusions 331 and second protrusions 332 can be readily positioned with respect to joining portions 321 in the Z direction, as compared with a case where first protrusions 331 and second protrusions 332 are provided on end plate 200.

Second Embodiment

Hereinafter, a power storage module according to a second embodiment of the present technology will be described. Since the power storage module according to the second embodiment of the present technology is different from power storage module 1 according to the first embodiment of the present technology in terms of the configuration of the second protrusion, the same configurations as those of power storage module 1 according to the first embodiment of the present technology will not be described repeatedly.

Figure 9:
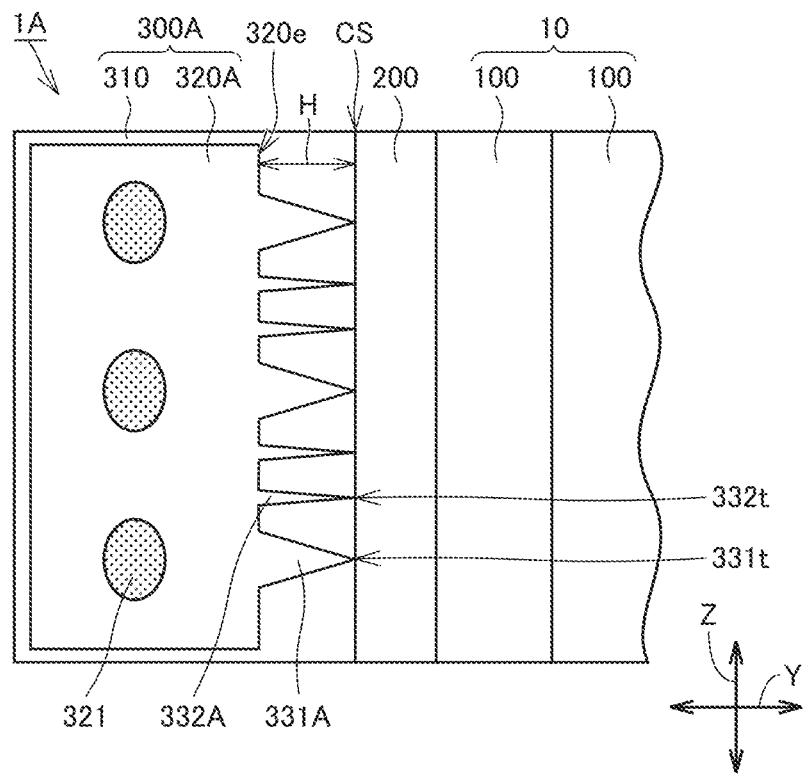
FIG. 9 is a schematic diagram showing a configuration of a power storage module according to a second embodiment of the present technology.

FIG. 9 is a schematic diagram showing the configuration of the power storage module according to the second embodiment of the present technology. As shown in FIG. 9, a power storage module 1A according to the second embodiment includes power storage cells 100, an end plate 200, and a restraint member 300A.

Restraint member 300A includes a plate-shaped portion 310 and a contact plate portion 320A. Contact plate portion 320A has a plurality of first protrusions 331A and a plurality of second protrusions 332A, each of which protrudes toward end plate 200.

A protruding height H of each of the plurality of second protrusions 332A in the first direction (Y direction) from an end surface 320e of contact plate portion 320A facing abutment surface CS is substantially the same as that of each of the plurality of first protrusions 331A.

Rigidity of each of the plurality of second protrusions 332A is lower than rigidity of each of the plurality of first protrusions 331A. In the present embodiment, since each of the plurality of second protrusions 332A occupies a smaller area on the YZ plane than each of the plurality of first protrusions 331A, the rigidity of each of the plurality of second protrusions 332A is lower than that of each of the plurality of first protrusions 331A. Thus, when load is applied from end plate 200 to contact plate portion 320A in response to the expansion of power storage cell 100, each of first protrusion 331A and second protrusion 332A is deformed, with the result that joining portions 321 are fed with load mainly composed of the load from first protrusions 331A.

In power storage module 1A according to the second embodiment of the present technology, since each of the plurality of first protrusions 331A and the plurality of second protrusions 332A has substantially the same protruding height and the rigidity of second protrusion 332A is lower than the rigidity of first protrusion 331A, joining portions 321 are fed with the load mainly composed of the load of first protrusions 331 while distributing the load applied from end plate 200 to contact plate portion 320A among the plurality of first protrusions 331A and the plurality of second protrusions 332A, with the result that the proof stress of each of joining portions 321 can be improved.

Third Embodiment

Hereinafter, a power storage module according to a third embodiment of the present technology will be described. Since the power storage module according to the third embodiment of the present technology is different from power storage module 1 according to the first embodiment of the present technology in terms of the configurations of the first protrusion and the second protrusion, the same configurations as those of power storage module 1 according to the first embodiment of the present technology will not be described repeatedly.

Figure 10:
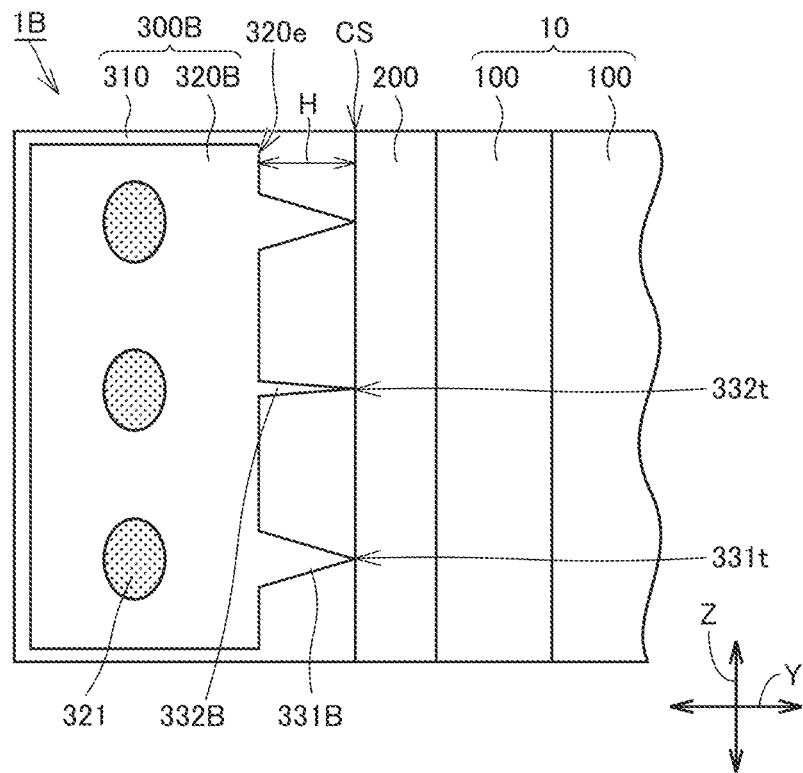
FIG. 10 is a schematic diagram showing a configuration of a power storage module according to a third embodiment of the present technology.

FIG. 10 is a schematic diagram showing the configuration of the power storage module according to the third embodiment of the present technology. As shown in FIG. 10, a power storage module 1B according to the third embodiment includes power storage cells 100, an end plate 200, and a restraint member 300B.

Restraint member 300B includes a plate-shaped portion 310 and a contact plate portion 320B. Contact plate portion 320B has a plurality of first protrusions 331B and one second protrusion 332B, each of which protrudes toward end plate 200. Each of the plurality of first protrusions 331B has a top portion 331t at a tip of first protrusion 331B. One second protrusion 332B has a top portion 332t at a tip of one second protrusion 332B. Rigidity of each of the plurality of first protrusions 331B is higher than rigidity of one second protrusion 332B.

In the Y direction, first protrusion 331 having top portion 331t overlapping with any one joining portion 321 of the plurality of joining portions 321 is disposed at a position of an end in the second direction (Z direction) among the plurality of first protrusions 331. In the present embodiment, corresponding ones of the plurality of first protrusions 331 are disposed to correspond to respective joining portions 321 at both ends in the Z direction among the plurality of joining portions 321.

In power storage module 1B according to the third embodiment of the present technology, since first protrusion 331B having top portion 331t overlapping with any one joining portion 321 of the plurality of joining portions 321 is disposed at the position of the end in the second direction (Z direction) among the plurality of first protrusion 331B, load can be facilitated to be applied to joining portion 321 located at the end and fed with smaller load than the load on joining portion 321 disposed at the center in the Z direction among the plurality of joining portions 321, with the result that load can be evenly applied to the plurality of joining portions 321.

Fourth Embodiment

Hereinafter, a power storage module according to a fourth embodiment of the present technology will be described. Since the power storage module according to the fourth embodiment of the present technology is different from power storage module 1 according to the first embodiment of the present technology in terms of the configuration of the first protrusion, the same configurations as those of power storage module 1 according to the first embodiment of the present technology will not be described repeatedly.

Figure 11:
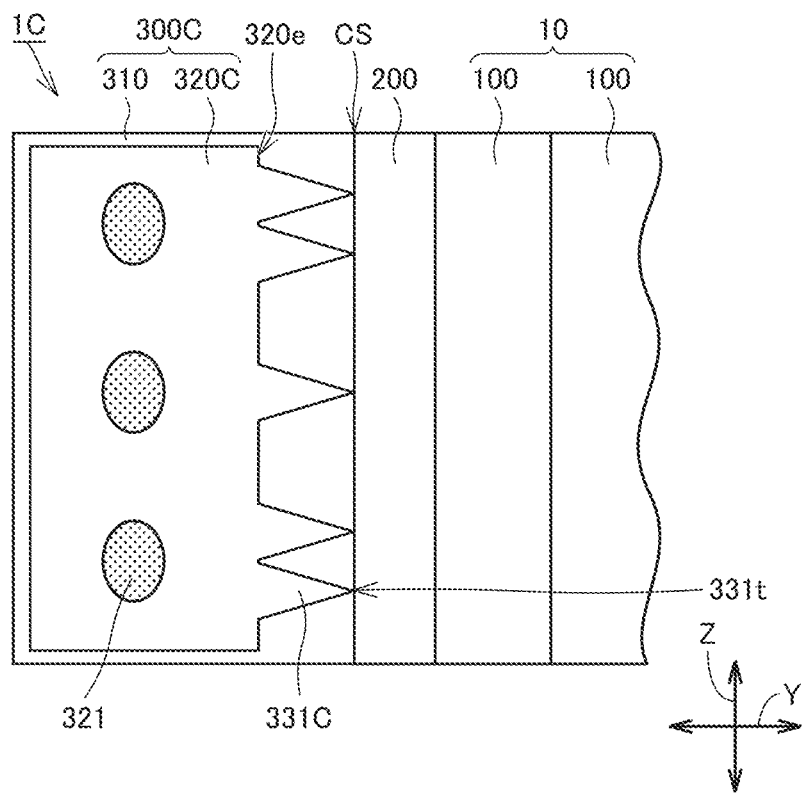
FIG. 11 is a schematic diagram showing a configuration of a power storage module according to a fourth embodiment of the present technology.

FIG. 11 is a schematic diagram showing a configuration of a power storage module according to a fourth embodiment of the present technology. As shown in FIG. 11, a power storage module 1C according to the fourth embodiment includes power storage cells 100, an end plate 200, and a restraint member 300C.

Restraint member 300C includes a plate-shaped portion 310 and a contact plate portion 320C. Contact plate portion 320C has a plurality of first protrusions 331C each protruding toward end plate 200. Each of the plurality of first protrusions 331C has a top portion 331t at a tip of first protrusion 331C.

Two first protrusions 331C each having top portion 331t overlapping with joining portion 321 in the Y direction are disposed to correspond to each of joining portions 321 disposed at both ends in the Z direction among the plurality of joining portions 321.

In power storage module 1C according to the fourth embodiment of the present technology, since two first protrusions 331C each having top portion 331t overlapping with joining portion 321 in the Y direction are disposed to correspond to each of joining portions 321 disposed at both ends in the Z direction among the plurality of joining portions 321, load is facilitated to be applied to joining portions 321 located at the both ends and fed with smaller load than the load on joining portion 321 disposed at the center in the Z direction among the plurality of joining portions 321, with the result that load can be applied evenly to the plurality of joining portions 321.

Fifth Embodiment

Hereinafter, a power storage module according to a fifth embodiment of the present technology will be described. Since the power storage module according to the fifth embodiment of the present technology is different from power storage module 1 according to the first embodiment of the present technology in terms of the configurations of the end plate and the contact plate portion, the same configurations as those of power storage module 1 according to the first embodiment of the present technology will not be described repeatedly.

Figure 12:
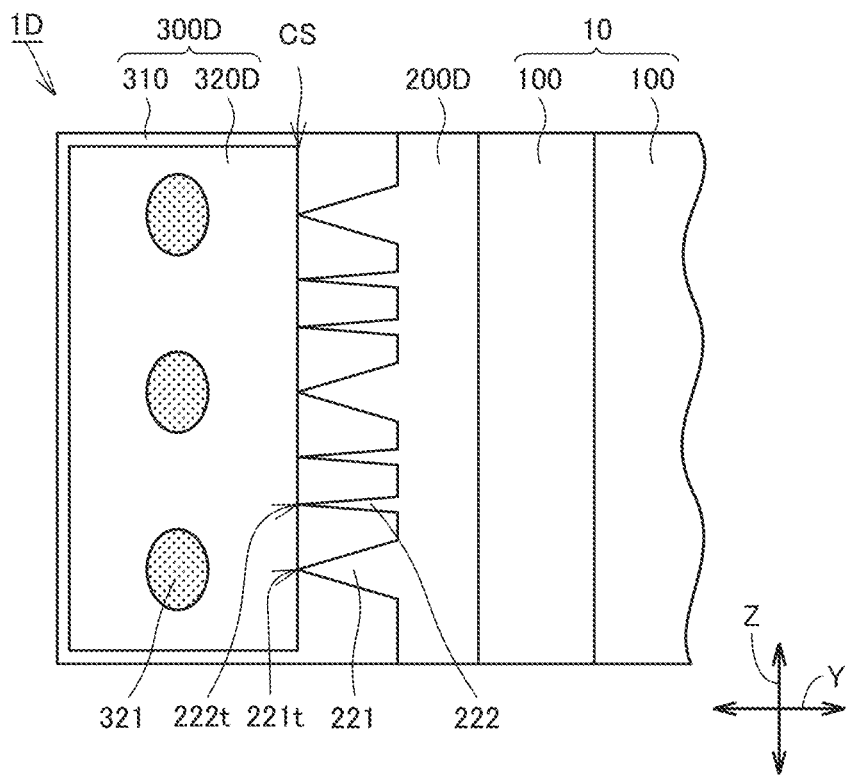
FIG. 12 is a schematic diagram showing a configuration of a power storage module according to a fifth embodiment of the present technology.

FIG. 12 is a schematic diagram showing a configuration of a power storage module according to a fifth embodiment of the present technology. As shown in FIG. 12, a power storage module 1D according to the fifth embodiment includes power storage cells 100, an end plate 200D, and a restraint member 300D. Restraint member 300D includes a plate-shaped portion 310 and a contact plate portion 320D.

Each of the plurality of first protrusions 221 and at least one second protrusion 222 are formed in end plate 200D. A plurality of second protrusions 222 are formed in end plate 200D in the present embodiment. Each of the plurality of second protrusions 222 is located between the plurality of first protrusions 221. Rigidity of each of the plurality of first protrusions 221 is higher than rigidity of each of the plurality of second protrusions 222.

Each of the plurality of first protrusions 221 has a top portion 221t at a tip of first protrusion 221. Each of the plurality of second protrusions 222 has a top portion 222t at a tip of second protrusion 222. In the present embodiment, each of the plurality of first protrusions 221 and the plurality of second protrusions 222 is formed by injection molding together with end plate 200D, for example.

In power storage module 1D according to the fifth embodiment of the present technology, since joining portions 321 are fed with load mainly composed of the load of first protrusions 221 while distributing the load applied from end plate 200D to contact plate portion 320D among the plurality of first protrusions 221 and the plurality of second protrusions 222, with the result that the proof stress of each of joining portions 321 can be improved.

Sixth Embodiment

Hereinafter, a power storage module according to a sixth embodiment of the present technology will be described. Since the power storage module according to the sixth embodiment of the present technology is different from power storage module 1 according to the first embodiment of the present technology in terms of the configurations of the end plate and the contact plate portion, the same configurations as those of power storage module 1 according to the first embodiment of the present technology will not be described repeatedly.

Figure 13:
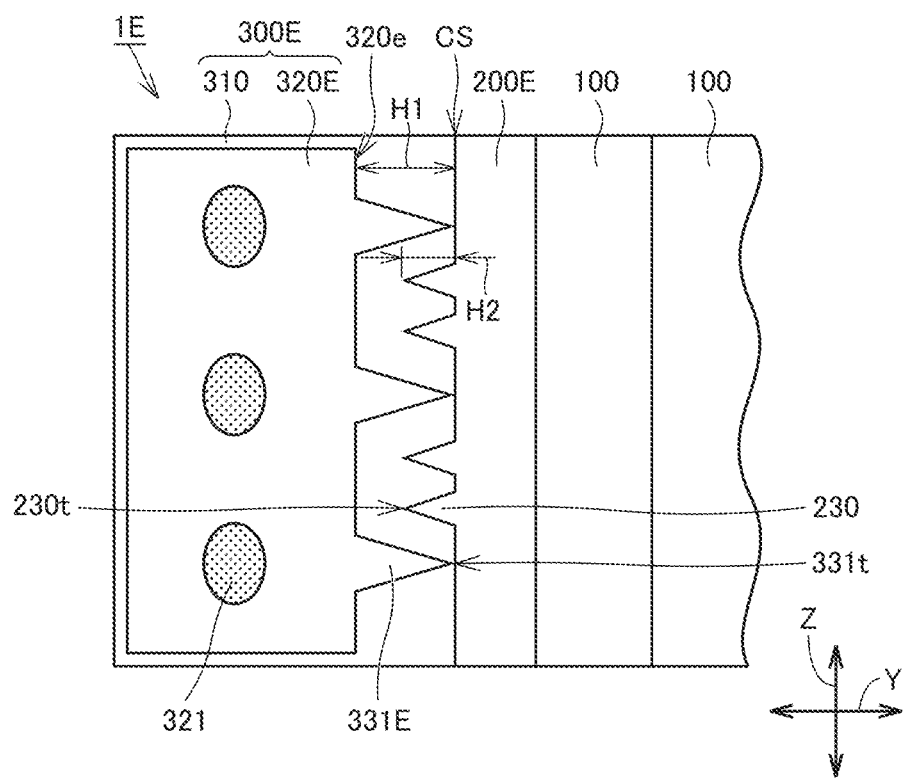
FIG. 13 is a schematic diagram showing a configuration of a power storage module according to a sixth embodiment of the present technology.

FIG. 13 is a schematic diagram showing the configuration of the power storage module according to the sixth embodiment of the present technology. As shown in FIG. 13, a power storage module 1E according to the sixth embodiment includes power storage cells 100, an end plate 200E, and a restraint member 300E.

Restraint member 300E includes a plate-shaped portion 310 and a contact plate portion 320E. Contact plate portion 320E has a plurality of first protrusions 331E each protruding toward end plate 200E. Each of the plurality of first protrusions 331E has a top portion 331t at a tip of first protrusion 331E. The plurality of first protrusions 331E are in abutment with end plate 200E at top portions 331t on abutment surface CS.

End plate 200E is provided with a plurality of opposing protrusions 230. Each of the plurality of opposing protrusions 230 is located between the plurality of first protrusions 331E in the second direction (Z direction).

Each of the plurality of opposing protrusions 230 protrudes from end plate 200E toward contact plate portion 320E. A width of each of the plurality of opposing protrusions 230 in the second direction (Z direction) is narrower in a direction from end plate 200E toward contact plate portion 320E. Each of the plurality of opposing protrusions 230 has a top portion 230t at a tip of opposing protrusion 230 with the width of opposing protrusion 230 in the Z direction being narrower.

Each of the plurality of opposing protrusions 230 is disposed at a position at which opposing protrusion 230 can be brought into abutment with contact plate portion 320E. Specifically, a protruding height H2 of each of the plurality of opposing protrusions 230 in the Y direction from abutment surface CS is lower than a protruding height H1 of each of first protrusions 331E in the Y direction from end surface 320e.

The rigidity of each of the plurality of opposing protrusions 230 is lower than the rigidity of each of the plurality of first protrusions 331E. In the present embodiment, end plate 200E is composed of a material having a lower rigidity than that of contact plate portion 320E, with the result that the rigidity of each of the plurality of opposing protrusions 230 is lower than the rigidity of each of the plurality of first protrusions 331E. In the present embodiment, end plate 200E is composed of, for example, aluminum. Contact plate portion 320E is composed of iron, for example.

In response to expansion of power storage cell 100, end plate 200E is moved to the contact plate portion 320E side in the Y direction. Thus, when load is applied from end plate 200E to contact plate portion 320E, each of the plurality of first protrusions 331E is deformed to cause collapse of top portion 331t. Thereafter, when power storage cell 100 is further expanded, end plate 200E is further moved in the Y direction to bring each of the plurality of opposing protrusions 230 into abutment with contact plate portion 320E on end surface 320e, with the result that load is applied to each of the plurality of opposing protrusions 230. As a result, each of the plurality of opposing protrusions 230 is deformed to cause collapse of top portion 230t as with each of the plurality of first protrusions 331. Since the rigidity of each of the plurality of opposing protrusions 230 is lower than the rigidity of each of the plurality of first protrusions 331E, the load applied to joining portions 321 is mainly composed of the load from the plurality of first protrusions 331E even when the plurality of opposing protrusions 230 are deformed.

In power storage module 1E according to the sixth embodiment of the present technology, the plurality of first protrusions 331E are disposed in contact plate portion 320E, the plurality of opposing protrusions 230 are disposed in end plate 200E, and the rigidity of each of the plurality of opposing protrusions 230 is lower than the rigidity of each of the plurality of first protrusions 331E, so that joining portions 321 can be stably fed with the load mainly composed of the load applied from each of the plurality of first protrusions 331E, thereby improving the proof stress of each of joining portions 321.

Seventh Embodiment

Hereinafter, a power storage module according to a seventh embodiment of the present technology will be described. Since power storage module 1 according to the seventh embodiment of the present technology is different from the power storage module according to the first embodiment of the present technology in terms of the configuration of the restraint member, the same configurations as those of power storage module 1 according to the first embodiment of the present technology will not be described repeatedly.

Figure 14:
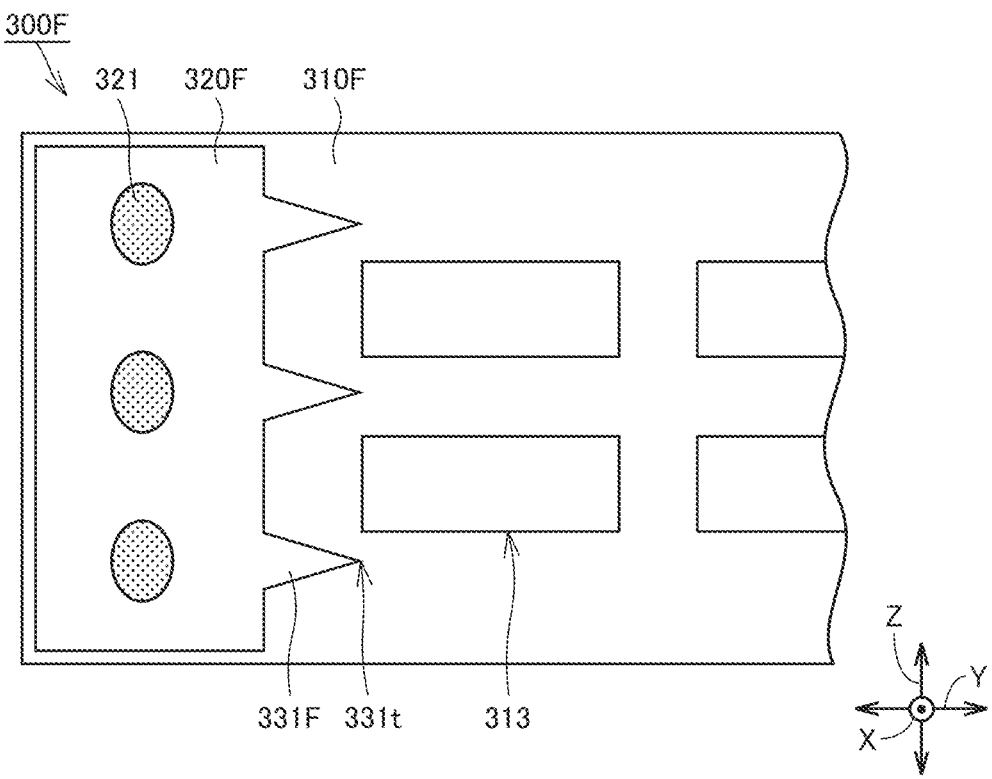
FIG. 14 is a schematic diagram showing a configuration of a restraint member included in a power storage module according to a seventh embodiment of the present technology.

FIG. 14 is a schematic diagram showing a configuration of a restraint member included in the power storage module according to the seventh embodiment of the present technology. As shown in FIG. 14, the power storage module according to the seventh embodiment includes power storage cells, an end plate, and a restraint member 300F. Restraint member 300F includes a plate-shaped portion 310F and a contact plate portion 320F. Contact plate portion 320F has a plurality of first protrusions 331F each protruding toward the end plate. Each of the plurality of first protrusions 331F has a top portion 331t at a tip of first protrusion 331F.

In plate-shaped portion 310F, hollow portions 313 are provided at portions not overlapping with contact plate portion 320F. In the present embodiment, the plurality of hollow portions 313 are provided in plate-shaped portion 310F at intervals in each of the Y direction and the Z direction. Each of hollow portions 313 has a rectangular shape having a long side direction in the Y direction.

Contact plate portion 320F is joined to plate-shaped portion 310F by a plurality of joining portions 321. Each of the plurality of joining portions 321 does not overlap with hollow portions 313 in the first direction (Y direction). Thus, when load is applied from the end plate to contact plate portion 320F, load propagated from the plurality of first protrusions 331F and applied to the plurality of joining portions 321 can be suppressed from being applied obliquely with respect to the Y direction. As a result, load in a rotational direction on the YZ plane can be suppressed from being applied to each of the plurality of joining portions 321.

In the power storage module according to the seventh embodiment of the present technology, since hollow portions 313 are provided in restraint member 300F and hollow portions 313 and joining portions 321 are not arranged side by side in the Y direction, load in the rotational direction on the YZ plane can be suppressed from being applied to the plurality of joining portions 321, with the result that the proof stress of each of joining portions 321 can be improved.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A power storage module, comprising:
a stack in which power storage cells are stacked in a first direction;
an end plate provided at each of both ends of the stack in the first direction; and
a restraint member in abutment with the end plate in the first direction, wherein
the restraint member includes
a plate-shaped portion extending in the first direction, and
a contact plate portion joined to the plate-shaped portion by a plurality of joining portions arranged side by side in a second direction orthogonal to the first direction, the contact plate portion being in abutment with the end plate,
a plurality of first protrusions, each of the plurality of first protrusions protruding in the first direction from one of the end plate and the contact plate portion toward the other of the end plate and the contact plate portion, is provided side by side in the second direction on an abutment surface between the end plate and the contact plate portion,
each of the plurality of first protrusions has a top portion at a tip of the first protrusion with a width of the first protrusion in the second direction being narrower in a direction from the one of the end plate and the contact plate portion toward the other of the end plate and the contact plate portion, and each of the plurality of first protrusions is in abutment with the other of the end plate and the contact plate portion at the top portion,
the plurality of first protrusions includes a first protrusion having a first top portion overlapping with any one joining portion of the plurality of joining portions when viewed in the first direction, and
the first protrusion is configured to, in response to an expansion of the power storage cells and the end plate moving toward the contact plate portion, deform to cause collapse of the first top portion.

2. The power storage module according to claim 1, further comprising:
at least one second protrusion provided between the plurality of first protrusions and protruding from the one of the end plate and the contact plate portion toward the other of the end plate and the contact plate portion, a width of the at least one second protrusion in the second direction being narrower in the direction from the one of the end plate and the contact plate portion toward the other of the end plate and the contact plate portion, wherein
the at least one second protrusion is disposed at a position at which the at least one second protrusion is configured to be brought into abutment with the other of the end plate and the contact plate portion.

3. The power storage module according to claim 2, wherein
a protruding height of the at least one second protrusion in the first direction from an end surface of the one of the end plate and the contact plate portion facing the abutment surface is lower than a protruding height of each of the plurality of first protrusions in the first direction from the end surface of the one of the end plate and the contact plate portion facing the abutment surface.

4. The power storage module according to claim 2, wherein
  a protruding height of the at least one second protrusion in the first direction from an end surface of the one of the end plate and the contact plate portion facing the abutment surface is substantially the same as a protruding height of each of the plurality of first protrusions in the first direction from the end surface of the one of the end plate and the contact plate portion facing the abutment surface, and
  rigidity of the at least one second protrusion is lower than rigidity of each of the plurality of first protrusions.

5. The power storage module according to claim 4, wherein
  the first protrusion having the first top portion overlapping with any one joining portion of the plurality of joining portions is disposed at a position of an end in the second direction among the plurality of first protrusions.

6. The power storage module according to claim 2, wherein
  each of the plurality of first protrusions and the at least one second protrusion are formed in the contact plate portion.

7. The power storage module according to claim 3, wherein
  each of the plurality of first protrusions and the at least one second protrusion are formed in the contact plate portion.

8. The power storage module according to claim 4, wherein
  each of the plurality of first protrusions and the at least one second protrusion are formed in the contact plate portion.

9. The power storage module according to claim 5, wherein
  each of the plurality of first protrusions and the at least one second protrusion are formed in the contact plate portion.

10. The power storage module according to claim 2, wherein
  each of the plurality of first protrusions and the at least one second protrusion are formed in the end plate.

11. The power storage module according to claim 3, wherein
  each of the plurality of first protrusions and the at least one second protrusion are formed in the end plate.

12. The power storage module according to claim 4, wherein
  each of the plurality of first protrusions and the at least one second protrusion are formed in the end plate.

13. The power storage module according to claim 5, wherein
  each of the plurality of first protrusions and the at least one second protrusion are formed in the end plate.

14. The power storage module according to claim 1, further comprising:
  at least one opposing protrusion located between the plurality of first protrusions in the second direction, the at least one opposing protrusion protruding from the other of the end plate and the contact plate portion toward the one of the end plate and the contact plate portion, a width of the at least one opposing protrusion in the second direction being narrower in a direction from the other of the end plate and the contact plate portion toward the one of the end plate and the contact plate portion, wherein
  the at least one opposing protrusion is disposed at a position at which the at least one opposing protrusion is configured to be brought into abutment with the one of the end plate and the contact plate portion, and
  rigidity of the at least one opposing protrusion is lower than rigidity of each of the plurality of first protrusions.

15. The power storage module according to claim 1, wherein
  a hollow portion is provided in the plate-shaped portion at a portion not overlapping with the contact plate portion, and
  each of the plurality of joining portions does not overlap with the hollow portion in the first direction.

16. The power storage module according to claim 1, wherein
  the abutment surface extends on a plane orthogonal to the first direction.

17. The power storage module according to claim 1, wherein
  each of the power storage cells has an exterior package having a substantially rectangular parallelepiped shape and accommodating an electrode assembly and an electrolyte solution, and
  the stack is sandwiched by the two end plates.

* * * * *